(12) United States Patent
Park

(10) Patent No.: US 6,344,731 B2
(45) Date of Patent: Feb. 5, 2002

(54) BATTERY GAUGING DEVICE DURING BATTERY CHARGING

(75) Inventor: Woo Seog Park, Kyounggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/736,193

(22) Filed: Dec. 15, 2000

(30) Foreign Application Priority Data

Dec. 18, 1999 (KR) .......................................... 99-59084

(51) Int. Cl.$^7$ ................................................. H02J 7/00
(52) U.S. Cl. ..................................................... 320/132
(58) Field of Search ................................. 320/125, 132, 320/134, 137

(56) References Cited

U.S. PATENT DOCUMENTS

| | | | | | |
|---|---|---|---|---|---|
| 4,746,852 A | * | 5/1988 | Martin | ........................ | 320/125 |
| 5,278,487 A | * | 1/1994 | Koenck | ........................ | 320/132 |
| 5,530,336 A | * | 6/1996 | Eguchi et al. | ............... | 320/134 |
| 6,016,047 A | * | 1/2000 | Notten et al. | ................ | 320/137 |

* cited by examiner

Primary Examiner—Peter S. Wong
Assistant Examiner—Pia Tibbits
(74) Attorney, Agent, or Firm—Fleshner & Kim, LLP

(57) ABSTRACT

Disclosed is a battery gauging device during a battery charging, which is capable of gauging the charged capacity during a battery charging in a terminal. The device according to the invention comprises a charger for converting an AC voltage to a DC voltage, and outputting the converted voltage, a battery pack including a battery for charging an electric charge, first switching means for switching on/off the DC voltage, and second switching means switched on/off in accordance with a battery charge enable (BCE) signal so as to temporarily discharge the charged capacity during the battery charging, and a terminal including a battery gauging section for gauging a charged capacity inputted from the battery pack and a microprocessor for outputting the BCE signal to the switching means, and displaying the gauged value on a display section. According to the invention, the DC voltage inputted from the charger to the battery pack is charged in the battery, but is regularly interrupted in the course of the battery charging so as to temporarily discharge the charged capacity, thereby realizing an exact display of the charged capacity on the terminal even during the battery charging.

20 Claims, 2 Drawing Sheets

BATTERY GAUGING DEVICE DURING BATTERY CHARGING

BACKGROUND OF THE INVENTION

1. Field of the Invention

The present invention relates to a battery gauging device, and in particular, to a battery gauging device, which can exactly display on a terminal the charged capacity of a chargable battery in the course of charging.

2. Description of the Prior Art

FIG. 1 is a block diagram illustrating the conventional battery gauging device in a mobile telecommunication terminal during a battery charging.

Referring to FIG. 1, the conventional battery gauging device in a mobile telecommunication terminal during a battery charging comprises: a charger 101 for converting a received alternate current (AC) to a direct current (DC), and controlling the charging and discharging of a battery 102a; a battery pack 102 for receiving the DC, and charging an electric charge into the battery 102a; and a mobile telecommunication terminal 103 for receiving an output voltage BAT+ of the battery pack 102, and displaying the charged capacity of the battery 102a by measuring the voltage BAT+ of the battery 102a.

Here, the battery pack 102 comprises: the battery 102a for charging the electric charge; a charging/discharging controller 102b for controlling charging and discharging of the battery 102a, and protecting a circuit; and a switch 102c for switching on or off the DC inputted to the battery 102a under a control by the charging/discharging controller 102b.

The mobile telecommunication terminal 103 comprises: a system electric power section 103a for receiving the DC voltage BAT+ outputted from the battery pack 102, and supplying the power of the system; a battery gauging section 103b for converting a level of the DC voltage BAT+ to a digital signal; and a mobile station modem 103c as a microprocessor for receiving the digital signal from the battery gauging section 103b, and displaying the capacity of the battery 102a on the display section 103c.

A thermistor 102d is connected to a ground terminal of the battery 102a, which converts the temperature of the battery 102a to an electric signal, to control charging and discharging of the battery 102a in accordance with the temperature. The charger 101 detects a voltage TH of the thermistor 102d, and checks the temperature of the battery 102a to control the charging and discharging of the battery 102 in accordance with the temperature.

The following is a brief explanation of an operation of the battery gauging device during a battery charging of a mobile telecommunication terminal having the above construction.

Once inputted to the charger 101, the AC is converted to the DC of a proper level required to charge the battery pack 102, and outputted. The DC is applied to the battery 102 through the switch 102c so as to charge the battery 102a.

The charging/discharging controller 102b is connected to the positive terminal + and a negative terminal to detect the voltage of the battery 102a, and interrupts charging by switching off the switch 102c when the voltage of the battery 102a reaches a predetermined value.

The charging/discharging controller 102b plays a role of preventing an excessive charge of the battery 102a above a predetermined voltage as well as of preventing an excessive discharge below a predetermined voltage. The charging/discharging controller 102 also plays a role of preventing an excessive current due to a short as well as protecting a circuit by preventing charging under the temperature higher than a predetermined one.

The DC inputted from the charger 101 to the battery pack 102 charges the battery 102a, and supplies an electric power to the terminal 103 while the charged voltage becomes an output voltage BAT+ of the battery pack 102 and is inputted to the terminal 103 for charging.

To be specific, the voltage of the battery 102a is not inputted to the terminal 103 during the charging. Instead, the DC voltage inputted from the charger 101 to the battery pack 102 is inputted to the terminal 103.

If the output voltage BAT+ of the battery pack 102 is inputted to the terminal 103, it is detected by the MSM 103c, which subsequently transmits a "switch-on" signal to the electric power section 103a of the system so as to receive the output voltage BAT+ of the battery pack 102 and supply a power to the terminal 103.

At this stage, the battery gauging section 103b receives the voltage BAT+ inputted from the terminal 103 from the system electric power section 103a, and converts the voltage level to a digital signal for transmission to the MSM 103c. Then, the MSM 103c displays a capacity of the battery 102a through the display section 103d in accordance with the transmitted digital signal.

As described above, however, the DC inputted to the battery pack 102 from the charger 101 charges the battery 102a, and at the same time, the output voltage BAT+ is inputted to the terminal 103 so that the voltage of the battery 102a may not be inputted to the terminal 103 during the charging but that the DC voltage inputted from the charger 101 to the battery pack 102 can be inputted to the terminal.

Thus, the output voltage BAT+ of the battery pack 102, which has been received from the system electric power section 103a by the battery gauging section 103b of the terminal 103 is not a voltage from the battery 102a but the voltage from the charger 101. Therefore, the charged capacity of the battery 102 displayed on the display section 103d is always indicated to be full.

As described above, the conventional battery gauging device during a battery charging has a drawback of failing to display a capacity of the battery because of inability to measure voltage of the battery 102a since the DC voltage inputted from the charger 101 is inputted directly to the power supply of the terminal 103 during the battery charging.

SUMMARY OF THE INVENTION

It is, therefore, an object of the present invention to provide a battery gauging device during a battery charging, which can exactly display the charged capacity of a battery even in the course of a battery charging by regularly interrupting the voltage inputted to the battery and measuring the voltage of the battery at that time during the charging.

To achieve the above object, there is provided a battery gauging device during a battery charging according to the present invention, comprising: a charger for converting an AC voltage to a DC voltage, and outputting the converted voltage; a battery pack including a battery for charging an electric charge, first switching means for switching on/off the DC voltage, and second switching means being switched on/off by a battery charge enable (BCE) signal so as to temporarily discharging the charged capacity during the battery charging; and a terminal including a battery gauging section for gauging charged capacity inputted from the battery pack, and a microprocessor for outputting the BCE signal to the switching means, and displaying the gauged value to the display section.

Preferably, the battery pack includes a charging/discharging controller for controlling charging and discharging of the battery and protecting an internal circuit by controlling switch on/off of the first switching means so as to control supply of the DC voltage inputted from the charger to the battery; and temperature detection means connected to a ground terminal of the battery for detecting temperature of the battery, and converting the temperature value to an electric signal for output of the same.

Preferably, the terminal includes a system electric power section for receiving an output voltage of the battery pack from the terminal, and supplying a power to constitutional elements inside thereof, and outputting a voltage for battery gauging to the battery gauging section.

Preferably, the first and the second switching means are field effect transistors (FET).

More preferably, the second switching means is positioned between the first switching means and positive terminal of the battery.

According to the present invention constructed above, the charged capacity of a battery can be exactly read and displayed on the terminal even during the battery charging.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
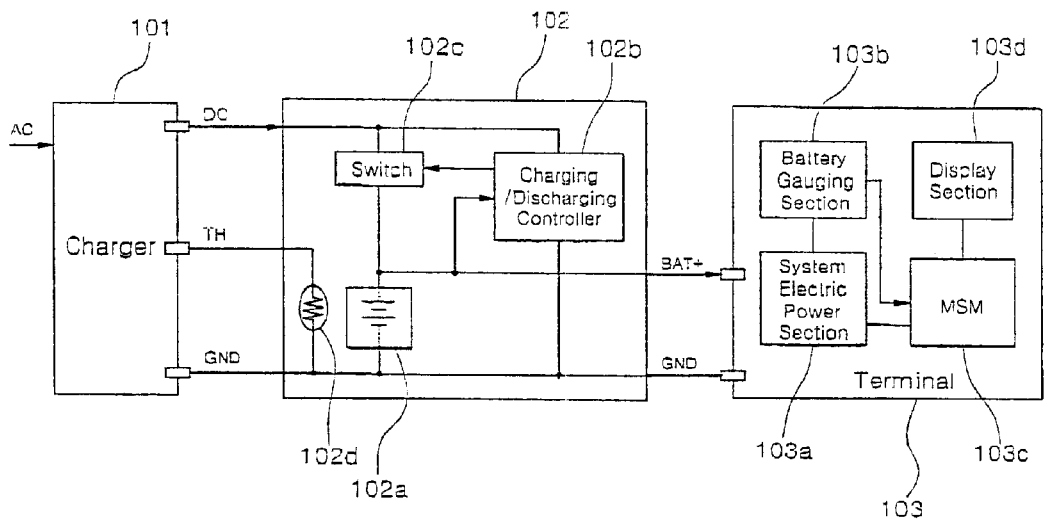
FIG. 1 is a block diagram illustrating the conventional battery gauging device in a mobile telecommunication terminal during a battery charging.
Figure 2:
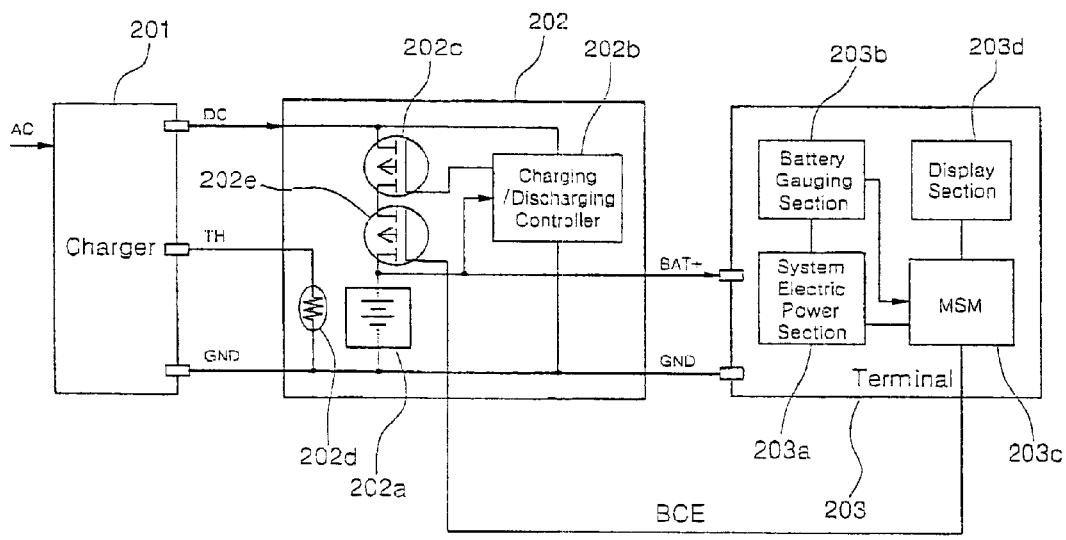
FIG. 2 is a block diagram illustrating a battery gauging device in a mobile telecommunication terminal during a battery charging according to the present invention.

FIG. 2 is a block diagram illustrating a battery gauging device in a mobile telecommunication terminal during a battery charging according to the present invention. Referring to FIG. 2, the battery gauging device during a battery charging according to the present invention comprises: a charger 201 for converting an AC voltage to a DC voltage for output of the converted voltage; a battery 202a for charging an electric charge; a charging/discharging controller 202b for controlling charging and discharging of the battery 202a, and protecting a circuit; a battery pack 202 including a first transistor 202c for switching on/off the DC voltage inputted from the charger 201 to the battery 202a under a control by the charging/discharging controller 202b, and a second transistor 202e for temporarily interrupting the DC voltage inputted to the battery 202a so as to measure voltage of the battery 202a by means of a BCE signal; and a terminal 203 for generating the BCE signal for controlling the second transistor 202e, and displaying the charged capacity of the battery by measuring an output voltage BAT+ of the battery pack 202.

Preferably, the terminal 203 includes a system electric power section 203a for supplying a power to the system by receiving the output voltage BAT+ of the battery pack 202, a battery gauging section 203b for converting the output voltage BAT+ of the battery pack 202 to a digital signal, and an MSM 203c as a microprocessor for displaying the charged capacity of the battery on the display section 203d by receiving the digital signal from the battery gauging section 203b.

A thermistor 202d is connected to a ground terminal GND of the battery 202a, which converts the temperature of the battery 202a to an electric signal, to control charging and discharging of the battery 202a in accordance with the temperature. The charger 201 detects a voltage TH of the thermistor 202d, and checks the temperature of the battery 202a to control the charging and discharging of the battery 202 in accordance with the temperature.

Preferably, the embodiment of the present invention uses an FET as switching means, which has a fast switching velocity and a superior resistance to noise.

The following is a detailed description of an operation of the battery gauging device during a battery charging in a mobile telecommunication terminal according to the present invention.

The charger 201 converts an inputted AC voltage to a DC voltage of a level required for charging, and outputs the converted voltage to the battery pack 202. The battery pack 202 receives the DC voltage so as to be charged in the battery 202 provided inside thereof.

The charging process is as follows. The DC voltage inputted to the battery pack 202 is charged to the battery 202a through the first transistor 202c and the second transistor 202e connected thereto, and through a loop provided for the battery 202a.

At this stage, the charging/discharging controller 202b detects the charged voltage of the battery 202a by being connected to the positive terminal + and the negative terminal − and switches off the first transistor 202c if the charged voltage reaches a certain value. When the first transistor 202c is switched off, the DC voltage is not supplied to the battery 202a, thereby impeding the charging operation.

Here, the charging/discharging controller 202b plays a role of protecting the circuit such as preventing an excessive charging of the battery 202a above a certain voltage level and an excessive discharging of the battery 202a below a certain voltage as well as an excessive current caused by a short and a charging above a certain temperature.

Meanwhile, the DC voltage inputted from the charger 201 to the battery pack 202 is charged to the battery 202a, and becomes an output voltage BAT+ of the battery pack 202 so as to be inputted to the terminal 203.

The terminal 203 is supplied an electric power at the output voltage BAT+ of the battery pack 202 during the charging. The MSM 203c inside of the terminal 203 detects the electric power supply, and transmits a switch-on signal to the system electric power section 203a.

The system electric power section 203a then receives the inputted output voltage BAT+ of the battery pack 202, and supplies a necessary electric power to the terminal 203.

At this stage, the terminal 203 can measure the battery voltage by measuring the output voltage BAT+ of the battery pack 203. Here, the measured voltage is not the charged voltage of the battery 202a but the DC voltage inputted to the battery pack 202.

To be specific, the charged voltage of the battery 202a during the charging is not inputted to the terminal 203. Instead, the DC voltage inputted to the battery pack 202 is inputted to the terminal 203. Therefore, the actually charged voltage of the battery 202a cannot be measured by measuring the output voltage BAT+ of the battery pack 202.

Therefore, the charged voltage of the battery 202a is inputted to the terminal 203 as the output voltage BAT+ of the battery pack 202 by interrupting the DC voltage charging the battery 202a, and discharging the charged voltage of the battery 202a.

For that purpose, the MSM 203c regularly outputs the BCE signal to the battery pack 202 so as to control the output voltage BAT+ of the battery pack 202.

The BCE signal inputted to the battery pack 202 is inputted to a gate terminal of the second transistor 202e to control switch on/off of the second transistor 202e, thereby regularly interrupting the DC voltage inputted to the battery 202a from the charger 201.

To be specific, when the BCE signal inputted to the battery pack 202 is in a Low state, the second transistor 202e is switched on. As a consequence, the DC voltage inputted from the charger 202 is supplied to the battery 202a to charge the battery 202a, and outputted as the output voltage BAT+ of the battery pack 202.

When the BCE signal is in a High state, the second transistor 202e is switched off. As a consequence, the DC voltage is temporarily interrupted, and the output voltage BAT+ of the battery pack 202 becomes a charged capacity of the battery 202a caused by a discharge of the battery 202a.

Figure 3:
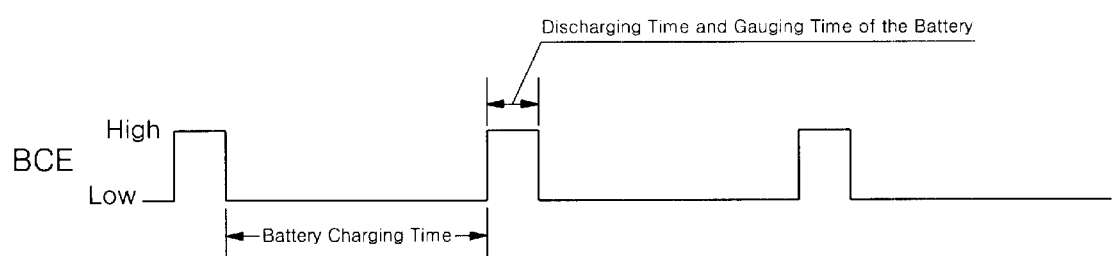
FIG. 3 is a timing chart illustrating a timing of a BCE signal for controlling the second transistor of the battery gauging device in a mobile telecommunication terminal according to the present invention.

Preferably, the BCE signal is a signal having a cycle, in which the time for discharging and gauging the battery 202a is shorter than the time for charging the battery 202a for an effective charge of the battery 202a, as shown in FIG. 3.

As described above, the DC voltage inputted from the charger 201 becomes the output voltage BAT+ of the battery pack 202 if the MSM 203c outputs the BCE in a Low state. By contrast, if the MSM 203c outputs the BCE in a High state, the DC voltage is interrupted by the second transistor 202e, and the discharged voltage of the battery 202a becomes the output voltage BAT+.

The battery gauging section 203b receives the voltage BAT+ inputted to the terminal 203 when the BCE signal is in a High state under a control by the MSM 203c, and converts the corresponding voltage level to a digital signal for output to the MSM 203c.

Then, the MSM 203c exactly displays the currently charged capacity of the battery 202a on the display section 203d in accordance with the digital signal inputted from the battery gauging section 203b.

Thus, the charged capacity of a battery can be exactly displayed even in the course of the battery charging by temporarily intenrrupting the voltage applied to the battery 202a from the charger 201 and discharging the battery 202a as well as by measuring the current voltage of the battery 202a.

The following is a detailed description of a gauging operation of a mobile telecommunication terminal according to an embodiment of the present invention.

The gauging operation of the battery 202a, which is performed under the power-on state of the terminal 203, can be classified into two: the gauging operation during the battery charging under connection of the battery 202a to the charger 201; and the gauging operation during an operation of the terminal 203 performed by the battery pack 202 under disconnection of the battery 202a from the charger 201.

The gauging operation during the battery charging under connection of the battery 202a to the charger 201 will be explained first. The charged capacity of the battery 202a is discharged due to non-appliance of the charged voltage from the charging/discharging controller 202b to the battery pack 202 despite the connection of the battery pack 202 to the charger 201. Thus, the discharged capacity of the battery 202a is inputted to the terminal 203 as the output voltage BAT+.

In this process, the battery gauging section 203b gauges the battery voltage, and transfers the gauged level to the MSM 203c in a digital signal. The MSM 203c then displays the charged state of the battery 202a on the display section 203d.

The gauging operation during the battery charging under disconnection of the battery 202a from the charger 201 will now be explained.

The MSM 203c switches off the second transistor 202e with the BCE signal in a High state for the period of time required for gauging the battery 202a. As a consequence, the charged voltage of the battery 202a is discharged, and the discharged voltage is detected by the system electric power section 202a of the terminal 203 connected to the positive terminal + of the battery 202a. The battery gauging section 202b then gauges the detected voltage.

At this stage, the battery gauging section 203b converts the gauged voltage of the battery to a digital signal, and outputs the converted digital signal to the MSM 203c. The MSM 203c then displays a level value corresponding to the digital signal on the display section 203c.

Although the embodiment of the present invention exemplified a mobile telecommunication terminal, the present invention is also applicable to diverse kinds of portable terminals using chargable batteries.

As described above, the battery gauging device according to the present invention is capable of exactly displaying the charged capacity of a battery even during the battery charging by temporarily interrupting the voltage applied to a battery pack from the charger for charging, discharging the battery, and by measuring the output voltage of the battery pack during the discharging.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A battery gauging device, comprising:
 a charger to convert an AC voltage to a DC voltage, and to output the converted DC voltage;
 a battery pack including a battery coupled to receive an electric charge from the charger, a first switch to switch on/off the DC voltage from the charger, and a second switch coupled to receive a battery charge enable (BCE) signal and configured to switch on/off in accordance with a state of the BCE signal to interrupt the battery charging and discharge the charged capacity of the battery for a prescribed period of time; and
 a telecommunication terminal having a battery gauging section configured to measure a level of charge of the battery pack, and a microprocessor coupled to provide the BCE signal to the second switch, wherein the telecommunication terminal is configured to display the measured value of the battery charge on a display section of the telecommunication terminal.

2. The battery gauging device of claim 1, wherein the battery pack further comprises:

a charging/discharging controller to control charging and discharging of the battery and to protect circuitry of the battery gauging device by controlling the switching on/off of the first switch to control a supply of the DC voltage inputted from the charger; and a temperature detection circuit coupled to a ground terminal of the battery to detect a temperature of the battery, convert the detected temperature value to an electric signal, and output the converted electric signal.

3. The battery gauging device of claim 1, wherein the telecommunication terminal further comprises a system electric power section coupled to receive an output power from the battery pack and provide electric power to elements of the communication terminal, and output a voltage for battery gauging to the battery gauging section.

4. The battery gauging device of claim 1, wherein the first and the second switch each comprise a field effect transistor.

5. The battery gauging device of claim 1, wherein the second switch is coupled between the first switch and a positive terminal of the battery.

6. The battery gauging device of claim 1, wherein the microprocessor controls the second switch by outputting the BCE signal to the second switch at prescribed intervals.

7. The battery gauging device of claim 6, wherein the prescribed intervals of the BCE signal output from the microprocessor has a cycle in which a switched-on time is longer than a switched-off time of the second switch.

8. The battery gauging device of claim 6, wherein when the BCE signal is received by the second switch, the second switch prevents the electric charge from the charger from passing to the battery so that the battery gauging section can determine the level of charge of the battery.

9. The battery gauging device of claim 1, wherein the output voltage of the battery pack inputted to the communication terminal is provided by one of the DC voltage inputted from the charger to the battery pack when the first and second switches are switched on and the existing battery charge when the second switch is switched off.

10. The battery gauging device of claim 9, wherein when the output voltage of the battery pack is provided by the existing battery charge, the battery gauging section can determine an accurate level of charge of the battery.

11. The battery gauging device of claim 1, wherein the battery gauging section converts the charged capacity of the battery inputted from the battery pack to a digital signal, and outputs the converted digital signal to the microprocessor.

12. The battery gauging device of claim 1, wherein the telecommunication terminal receives and detects the charged capacity of the battery.

13. The battery gauging device of claim 1, wherein the telecommunication terminal is a mobile telecommunication terminal using at least one chargeable battery.

14. A method of measuring a level of charge in a battery of a mobile communication terminal during the charging process, comprising:

receiving a DC charging voltage by a battery pack, the battery pack having first and second switches, a battery, and a charging/discharging controller;

monitoring the level of charge of the battery by the charging/discharging controller, and switching off the first switch to interrupt the charging process when the level of charge reaches a certain value;

providing a battery charge enable (BCE) signal from a microcontroller of the mobile communication terminal to the second switch, the BCE having one of a first state and a second state to control an operation of the second switch, wherein the first state of the BCE signal causes the second switch to interrupt the DC voltage charging the battery, and wherein the second state of the BCE signal causes the second switch to provide the DC voltage to the battery to charge the battery; and measuring a level an output voltage of the battery when the second switch has interrupted the DC voltage to the battery.

15. The method of claim 14, wherein when the second switch interrupts the DC voltage to the battery, the battery begins discharging able tinged to the mobile communication terminal.

16. The method of claim 15, wherein a battery gauging section of the mobile communication terminal measures a level the output voltage of the battery when the second switch has interrupted the DC voltage to the battery, and wherein a display section of the mobile communication terminal displays the measured level of the output voltage of the battery.

17. The method of claim 14, wherein the charging/discharging controller further protects circuits of the battery pack by preventing excess discharging of the battery.

18. The method of claim 14, wherein the microcontroller of the mobile communication terminal is directly coupled to the second switch to provide the BCE signal.

19. The method of claim 14, wherein the mobile communication terminal is provided with the DC charging voltage when the second switch is configured to provide the DC voltage to the battery to charge the battery.

20. A mobile communication terminal, comprising:

a battery pack including a battery coupled to receive an electric charge from a charger, a first switch to switch the DC voltage from the charger on or off in accordance with an output of a controller of the battery pack, and a second switch coupled to directly receive a battery charge enable (BCE) signal from a microproccesor of the mobile communication terminal and configured to switch the DC voltage from the charger on or off in accordance with a state of the BCE signal; and a battery gauging device configured to measure a level of charge in the battery when the second switch has switched the DC voltage to the battery off and display the measured level of charge on a display section of the mobile communication terminal.

* * * * *